United States Patent [19]

Fetchu et al.

[11] 4,285,651

[45] Aug. 25, 1981

[54] EXTRUSION DIE HEAD AND METHOD OF MAKING THE SAME

[75] Inventors: David C. Fetchu, Tallmadge; William H. Weidman, Independence, both of Ohio

[73] Assignee: The General Tire & Rubber Company, Akron, Ohio

[21] Appl. No.: 121,942

[22] Filed: Feb. 15, 1980

[51] Int. Cl.³ .............................................. B29F 3/04
[52] U.S. Cl. .................................. 425/192 R; 29/412; 29/416; 29/425; 29/DIG. 26; 156/244.15; 156/244.25; 264/177 R; 425/380; 425/464; 425/467
[58] Field of Search ........ 425/464, 461, 465, 466–467, 425/380, 381, 192 R; 29/425, 412, 416, DIG. 26; 156/244.15, 244.25; 264/177 R, 171, 176 R

[56] References Cited

U.S. PATENT DOCUMENTS

| 579,939 | 3/1897 | Dawson et al. | 425/464 |
|---|---|---|---|
| 1,333,047 | 3/1920 | Valentine | 425/465 |
| 1,443,324 | 1/1923 | McGovern | 425/466 |
| 2,091,125 | 8/1937 | Stewart | 264/171 |
| 2,468,585 | 4/1949 | Bluma | 264/177 R |
| 3,046,602 | 7/1962 | Houvener | 425/464 |
| 3,298,085 | 1/1967 | Bleicher | 29/416 |
| 3,407,441 | 10/1968 | Vigansky et al. | 425/461 |
| 3,815,199 | 6/1974 | Malavazos | 29/416 |
| 4,189,293 | 2/1980 | Ether | 425/461 |

*Primary Examiner*—Jeffery R. Thurlow

[57] ABSTRACT

A new extrusion die head and method of making the same is provided that permits two strips of elastomeric material to be extruded simultaneously and one above the other from a single core of extrudate. The head is particularly useful for extruding sidewall strips in the manufacture of pneumatic tires. The head design has features common to both conventional strip extruding heads and to heads for extruding tubular shapes, commonly called tuber heads. However, the head is quite different from both the conventional strip extrusion heads and the conventional tuber heads, and has the advantage that it permits two strips to be extruded simultaneously through passages that are relatively short in length and are no wider than the width of a single sidewall strip. The design of the head and the method of making it are such that the extrusion passage surfaces can be easily machined to provide excellent flow characteristics, and the entire head is easily fabricated and cleaned.

13 Claims, 8 Drawing Figures

EXTRUSION DIE HEAD AND METHOD OF MAKING THE SAME

This invention relates to extrusion apparatus for forming strips of elastomeric material, and more particularly to the die head of such apparatus, and to the method of making the die head. The invention is especially useful in the extruding of rubber sidewall strips in the manufacture of pneumatic tires. At the present time, the common practice is to extrude one sidewall strip at a time on each available extruder. This means that, if the sidewall strips for both the right and left sides of the tire are to be extruded simultaneously, two separate extruders are required. The cost and floor space required for each extruder make it desirable to find a way to extrude both sidewalls from a single apparatus.

A possible solution to this problem might be to make an extremely wide head through which two sidewall strips might be extruded in side-by-side relationship. However, because the sidewall strips are very thin, and together they would constitute an extremely wide extrudate, large dimensional corrections would be required in the die plate profile in order that the final product have the exact shape desired. Also, in order to have the uniform flow velocity that is also required for maintaining close tolerances on the product shape, the angle of divergence within the head must be limited. To stay within this limited angle when extruding a very wide product, the head must be correspondingly longer. Not only does this make the head more costly, but the large "die fill" volume in such a head means an excessive amount of startup waste to achieve steady flow at the beginning of each run, and clean-out waste whenever cleaning of the die is needed at the end of a run. Also, longer flow passages cause more friction, and the head buildup from this friction limits the speed at which the extruder can be run, because the extrudate cannot be allowed to cure too much. This friction can be reduced by making the flow passages larger, but that solution aggravates the "die fill" problems.

Another possible way of extruding two sidewalls simultaneously on the same extruder is to extrude a tube using "tuber head" of the type shown in U.S. Pat. No. 3,321,346. The apparatus would be designed to produce a tubular shape, each side of which had the desired cross-section of one of the sidewall strips. The tube would then be slit in two diametrically opposed locations to produce the individual sidewalls. One problem in using such an apparatus would be the difficulty of profiling the curved head passage and die plate opening to make strips of varying thicknesses across their widths. Also, the "tuber head" apparatus would require a long head passage to make sidewall shapes, and the head would have to be adjustable to be able to make sidewalls of different thicknesses. Furthermore, changing the widths of the sidewalls would mean not only changing the die plate, but also changing to a new diameter head, unless the manufacturer is willing to put up with wasted scrap material that would be extruded through the gaps that would exist between the narrower sidewalls extruded from the same tuber head as the widest sidewalls.

The present invention provides an extrusion die head through which two elongated strips of elastomeric material, such as tire sidewall strips, may be extruded simultaneously and without the problems presented by the apparatus discussed above. The die head has passageways for two strips that are located one on top of the other, and in some respects it is similar to conventional heads for extruding flat strips and in other respects it is similar to tuber heads. However, there are many differences between the present invention and both the flat strip heads and the tuber heads.

The extrusion die head of the present invention has an inboard end that is to be located facing toward the extruder and an outboard end to be located facing away from the extruder. The die head includes an outer head section having a central opening extending from its inboard end to its outboard end, an inner head section located within this central opening and spaced from the walls of the central opening so as to define passages for the flow of elastomeric material through the head. In this respect the head is similar to a tuber head. However, the outer head section differs from that of an ordinary tuber head in that it includes a ring member having a central axis and extending from the inboard end to the outboard end of said extrusion die head. This ring member has centered on its central axis a radially inwardly facing conical surface having a relatively small diameter at the inboard end of the extrusion die head and a relatively large diameter at the outboard end of the extrusion die head. The outer head section also includes first and second cone members each having on one side a radially outwardly facing conical surface mating with the radially inwardly facing conical surface of the ring member and on the opposite side a flow passage surface for guiding and forming elastomeric material. The inner head section includes a middle cone member having for its side edges radially outwardly facing conical surfaces that also mate with the radially inwardly facing conical surface of the ring member, and for its top and bottom sides flow passage surfaces each of which face one of the flow passage surfaces of the first and second cone members and forms therewith an extrusion flow passage for guiding and forming this elastomeric material into a desired strip shape as this material passes from the inboard end to the outboard end of the extrusion die head.

The present invention also involves a method of making an extrusion die head that includes fabricating a ring member and machining on the ring member a radially inwardly facing conical surface. The method further involves fabricating a conical piece with an outboard end surface and an axially extending surface intersecting this outboard end surface, and machining the axially extending surface to form a radially outwardly facing conical surface that mates with the radially inwardly facing conical surface of the ring member. The conical piece is then cut into three cone members along two cutting planes that intersect its outboard end surface. Then, the surfaces that extend along these cutting planes are machined to a configuration such that when the cone members are mounted with their radially outwardly facing conical surfaces engaging the mating radially inwardly facing conical surface of the ring member, the surfaces extending along the cutting planes form two extrusion passages of the desired shape for guiding and forming elongated strips of elastomeric material.

These and other features of the present invention will be more apparent from the following detailed description and the attached drawings, in which.

Figure 1:
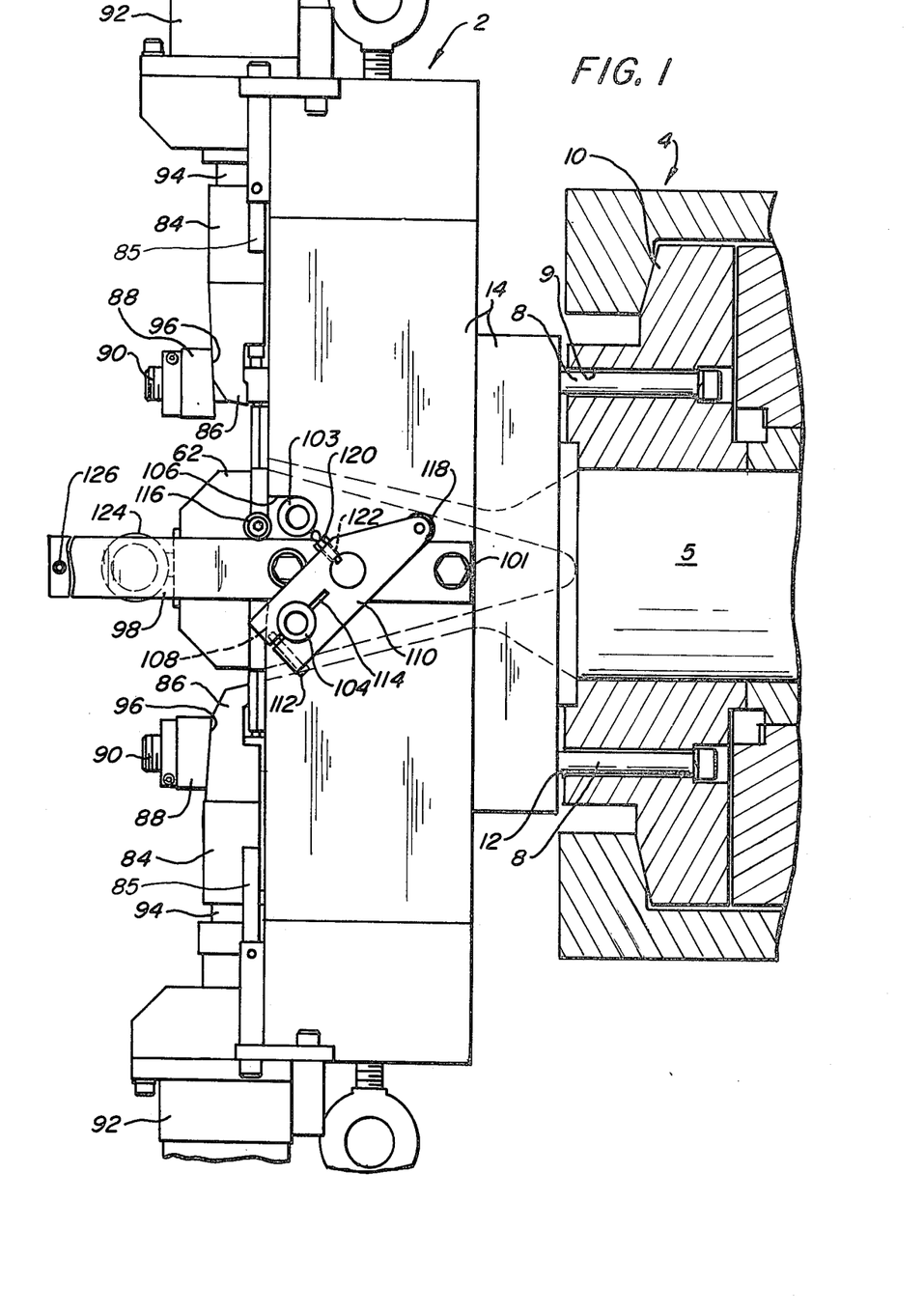
FIG. 1 is a side elevation of an extrusion die head shown attached to the front end of an extruder that is shown in longitudinal section.
Figure 3:
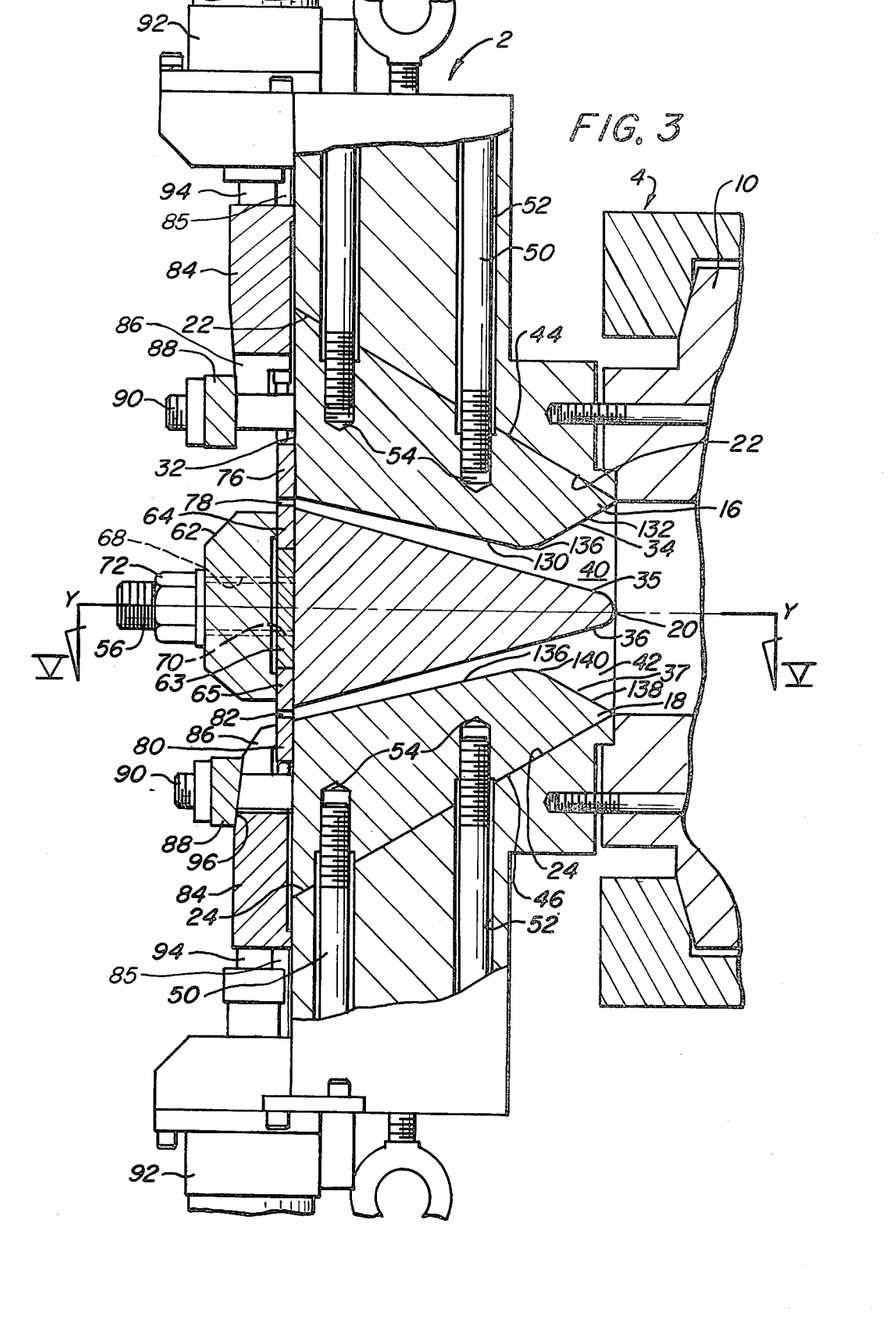
FIG. 3 is a cross-sectional view of a portion of the extrusion die head of FIGS. 1 and 2, taken along lines III—III of FIG. 2.

In FIG. 1, an extrusion die head 2 is shown mounted on the end of an extruder 4, having a generally round extruder bore 5. The inboard end 6 of the head 2 is secured to the extruder 4 by bolts 8, which pass through holes 9 in a front extruder member 10. As shown in FIG. 3, the bolts 8 are threaded into holes 12 of a ring member 14 that forms part of the extruder head 2.

The sectional view of FIG. 3 also shows that the extruder die head 2 includes not only the ring member 14, but also three cone members 16, 18, and 20, housed within a conical opening 22 in the ring member. The first and second cone members 16 and 18, and the middle cone member 20 are preferably cut from the same truncated conical piece 24, the form of which can be seen in the perspective view of FIG. 4. The conical piece 24 is cut along two cutting planes 26 and 28 which extend between its inboard end surface 30 and its outboard end surface 32. Preferably, the cutting planes 26 and 28 are each perpendicular to a vertical plane extending through the central longitudinal axis Y—Y of the conical piece 24, and the planes 26 and 28 also diverge away from each other as they approach the outboard end surface 32. The cone member surfaces of the 34, 35, 36 and 37 (FIG. 3), which are formed when the conical piece 24 is cut, are machined so as to form extrusion passages 40 and 42. The preferred shapes of these passages 40 and 42 and the method of machining them will be described below.

Figure 4:
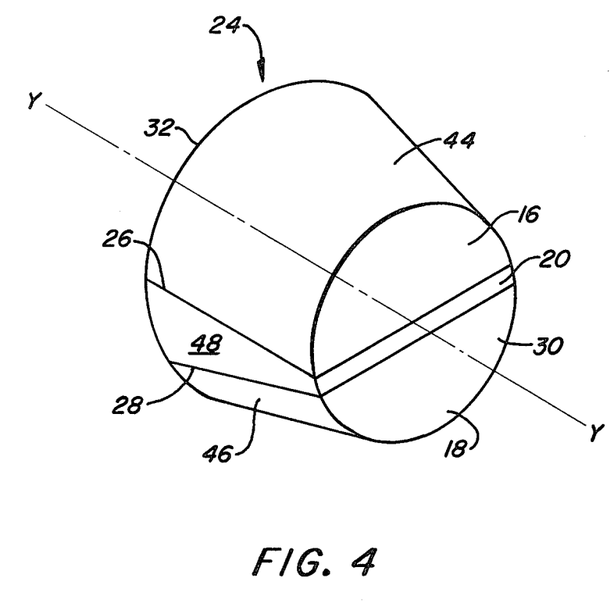
FIG. 4 is a perspective view of a conical shaped piece that is divided into three cone members, which form part of the extrusion die head of FIG. 1.
Figure 5:
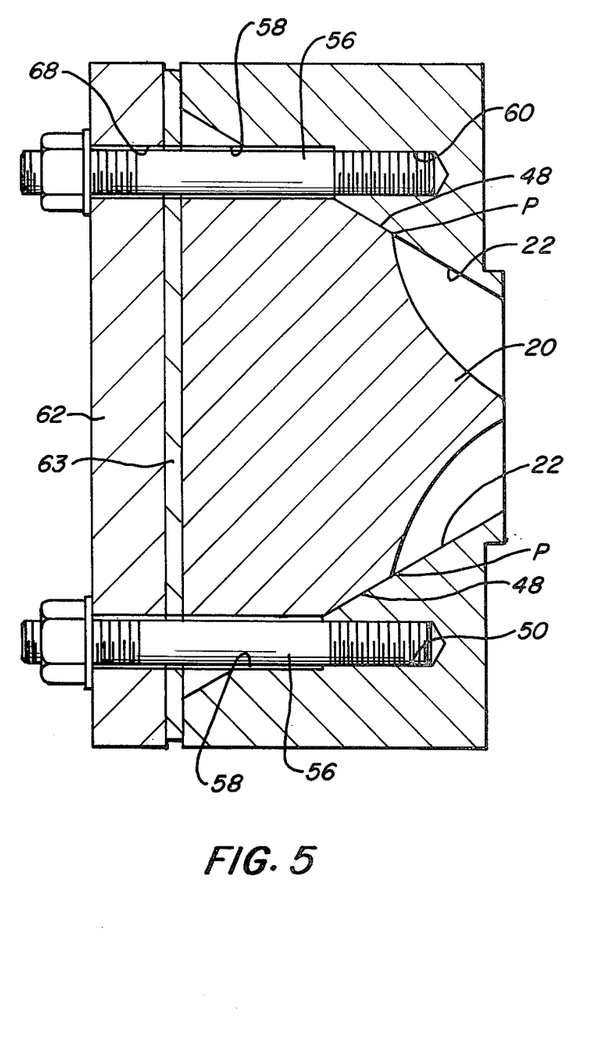
FIG. 5 is a cross-sectional view of a portion of the extrusion die head of FIGS. 1 through 3, taken along lines V—V of FIG. 3.

Being cut from the same conical piece 24, the cone members 16, 18 and 20 have radially outwardly facing conical surfaces 44, 46 and 48 respectively (FIG. 4). The conical piece 24 is machined so that these conical surfaces 44, 46 and 48 mate, at least around their peripheral edges, with the inwardly facing surface of conical opening 22 in the ring member 14, as shown in the cross-sectional views of FIGS. 3 and 5. The conical surfaces 44, 46, and 48 may be smooth, as shown in FIGS. 3 to 7, or they may have portions located inwardly of their peripheral edges indented to create air pockets between the cone members 16, 18, 20 and the ring member 14 to help control the heat transfer between the cone members and the ring member. The cone members 16 and 18 are held in the conical opening 22 by bolts 50 (FIG. 3) so that their respective conical surfaces 44 and 46 are in flush engagement with the mating inwardly facing surface of the conical opening 22. The bolts 50 extend through holes 52 in the ring member 14 and engage threaded holes 54 in the cone members 16 and 18. Likewise, as shown in FIG. 5, the middle cone member 20 is held with its lateral conical surfaces 48 in flush engagement the surface of conical opening 22 by bolts 56 extending through holes 58 in the middle cone member 20 and engaging threaded holes 60 in the ring member 14.

Figure 2:
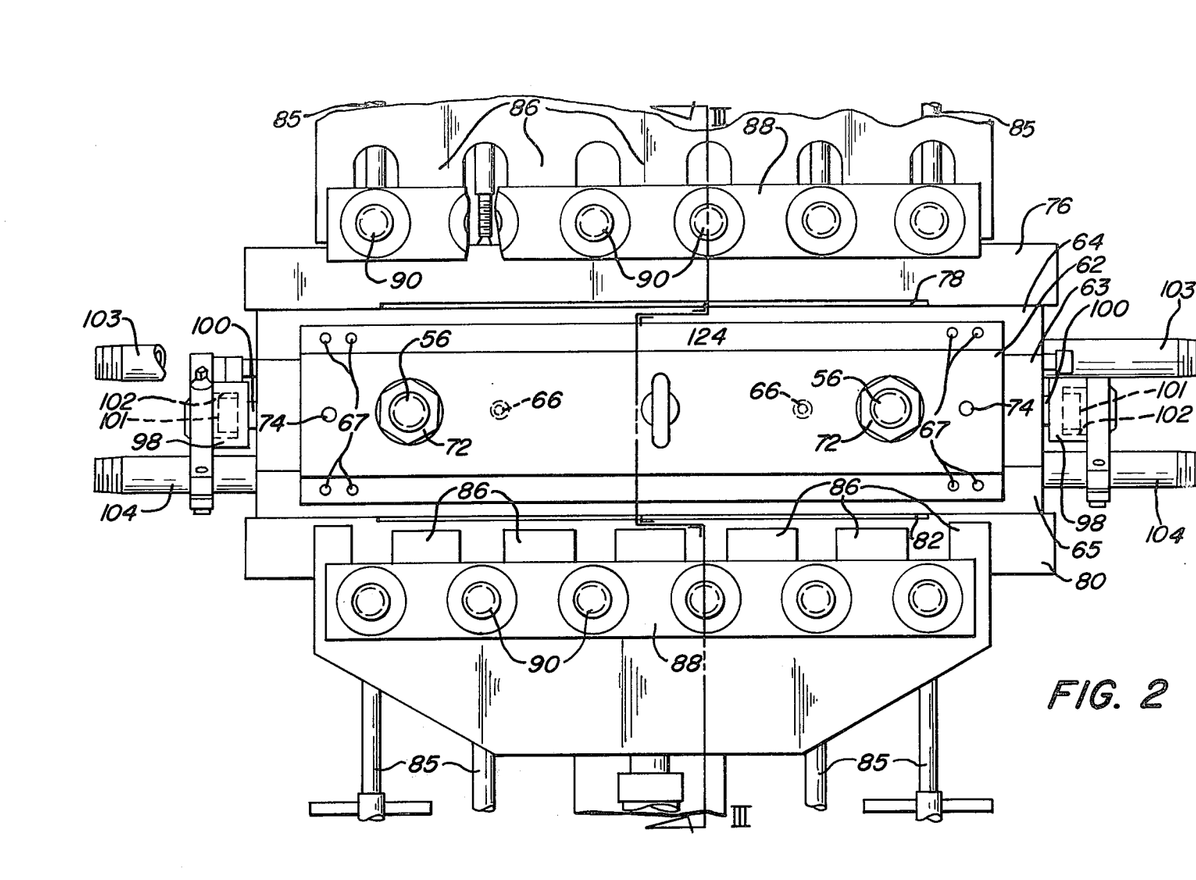
FIG. 2 is an end elevation of the outboard end of the extrusion die head of FIG. 1.

As shown in both the cross-section of FIG. 3 and the outboard end elevation of FIG. 2, a bolster bar 62 extends across the outboard end of the middle cone member 20, with a spacer plate 63 and die plates 64 and 65 held between the bolster bar 62 and the cone member 20. The spacer plate 63 is secured to the cone member 20 by screws 66, shown in dotted lines in FIG. 2, and the bolster bar 62 is in turn secured to the spacer plate 63 by screws 67 (FIG. 2). The bolts 56 that secure the cone member 20 to the ring member 14 pass through holes 68 and 70 in the bolster bar 62 and spacer plate 63 respectively (FIG. 3). Nuts 72 are threaded onto the outboard ends of the bolts 56 to hold the bolster bar 62, spacer plate 63, die plates 64 and 65, and cone member 20 firmly in place on the ring member 14.

The first and second cone members 16 and 18, together with the ring member 14, form an outer head section that seldom needs to be taken apart once the extrusion die head 2 is assembled. However, the inner head section formed by the middle cone member 20 is designed for frequent removal so that the extrusion passages 40 and 42 may be cleaned. To remove the cone member 20 from the ring member 14, the bolts 56 are unscrewed from their threaded holes 58 in the ring member 14. The cone member 20 usually tends to stick inside the cone members 16 and 18 due to extrudate that is trapped in the extrusion passages 40 and 42. So, to free the cone member 20, stripping screws 74 are located on either side of the bolster bar 62 (FIG. 2). The stripping screws 74 threadably engage tapped holes in the bolster bar 62 and their ends seat against the outboard end of the ring member 14 so that when the screws 74 are turned, the bolster bar 62 and attached cone member 20 are forced outwardly away from the ring member 14.

The outboard end of the extrusion passage 40 is covered by a pair of die plates 64 and 76 between which there is a die opening 78 that performs the final shaping operation on the elastomeric material that passes through the passage 40. Similarly, a pair of die plates 65 and 80, forming a die opening 82, are located at the outboard end of extrusion passage 42 for the same purpose. As described above, the bolster bar 62 holds the inner die plates 64 and 65 in place against the middle cone member 20. The outer die plates 76 and 80 are held against their respective cone members 16 and 18 by upper and lower clamp members 84, each of which have a number of fingers 86 (FIGS. 2 and 3) that are pressed against the die plate 76 or 80 by cam bars 88 mounted on pins 90 protruding from the outboard surfaces of cone member 16 and 18. The clamp members 84 slide up and down on guide rods 85 (FIG. 2), and these rods keep the clamp members from tilting or sliding laterally. The ends of rods 85 also engage the radially outward edge surfaces of die plates 64 and 80 (FIGS. 2 and 3) to keep the die plates from sliding radially outwardly. Pneumatic cylinders 92 operate pistons 94 connected to the clamp members 84 to move them toward or away from the die plates 76 and 80. The clamp member 84 at the top of FIGS. 1, 2, and 3 is shown in its retracted position, while the other clamp member 84 at the bottom of these figures is shown in its inward clamping position. As the pneumatic cylinders 92 push the clamp members 84 inwardly, camming surfaces 96 on the cam bars 88 wedge the fingers 86 of the clamp members against the die plates 76 and 80 to secure them in place against the cone members 16 and 18.

The middle cone member 20 with its attached spacer plate 63, die plates 64 and 65 and bolster bar 62 is usually too heavy to be lifted by hand out of the ring member 14. Thus, it is desirable to mount these parts on rails 98, shown in FIGS. 1 and 2, so that they may be easily rolled away from the ring member 14 when the extrusion passages 40 and 42 are to be cleaned. The rails 98 are of substantial height and width, as can be seen in FIG. 2, and each rail 98 is supported on two large bolts 100 extending from the side of ring member 14. The bolts 100 have heads 101 inset in recesses 102 in the rails 98, as shown in dotted lines in FIGS. 1 and 2. Two pipes 103 and 104, useful for circulating cooling water, extend from each side of the middle cone member 20 above and below the rail 98. Slots 106 and 108 are provided in the sides of ring member 14 at its outboard end, so that when the cone member 20 is rolled out on the rails 98, the pipes 103 and 104 can move freely out of these slots. A bracket 110 is clamped on the lower pipe 104, using a set screw 112 to pull together opposite sides of slotted opening 114 in the bracket. The cone member 20 and its attached parts is supported on the rail on rollers 116 extending from the side edges of the spacer plate 63, and by rollers 118 mounted on the top ends of bracket 110. The angle of the bracket 110 may be adjusted to insure free rolling of the rollers 116 and 118 by turning a set screw 120 that is threaded into a tapped hole 122 in the bracket 110 and has its head engaging the upper pipe 106. Finally, an eyebolt 124 is provided in the middle of bolster bar 62, for use in pulling the middle cone member 20 as it rolls out of the ring member 14 on rollers 116 and 118 rolling on rails 98. This, of course, is accomplished only after unscrewing the bolts 56 that hold the cone member 20 to the ring member 14, and if necessary, turning screws 74 to free the cone member 20 from elastomeric extrudate lodged in passages 40 and 42.

A roller stop 126 (FIG. 1) is preferably provided at the end of each rail 98 to engage the bracket 110 and keep the cone member 20 from rolling off the ends of the rails 98. Once rolled out, the cone member 20 and its connected parts may be completely removed from the rails 98, by means of an overhead crane with a hook attached to the eyebolt 124. Before doing this, any water lines attached to pipes 103 and 104 should be disconnected.

The cone members 16, 18, and 20 should be provided with cooling water passages, because these parts tend to heat up due to the friction of the extrusion process. Other than the water pipes 103 and 104, in the sides of the middle cone member 20, provisions for introducing such cooling water is not shown in the drawings. This is because a variety of water passage configurations may be used, and showing an example of one would unduly complicate the drawings. Cooling water may be easily circulated through the outer cone members 16 and 18 by means of appropriate pipes that extend through holes in the ring member 14. Pipes 103 and 104 illustrate but one example of how the cooling water may be fed into the middle cone member 20.

The surfaces 34 and 35 of extrusion passage 40 and the surfaces 36 and 37 of extrusion passage 42 are finally shaped after the conical piece 24 is cut into the three cone members 16, 18, and 20 along the cutting planes 26 and 28 (FIG. 4). The object in shaping the surfaces 34, 35, 36 and 37 is to create two passages 40 and 42 that will change the cylindrical shape of the extrudate coming from the bore 5 of the extruder 4 into two relatively thin, flat strips. Generally, this involves dividing the cylindrical extrudate into two halves, one above the other, and then simultaneously reducing the thickness of each strip, fanning it out to make it wider, and guiding the strips away from each other so that they emerge from the die head 2 spaced far enough apart so that a conveyor support for the upper strip can be interposed above the lower strip. Preferably, this should all be accomplished while maintaining the velocity profile of the extrudate as uniform as possible across the area of any cross section perpendicular to the central longitudinal axis Y—Y (FIG. 4). This is desirable so there will be as little distortion as possible due to velocity differences within the extrudate strip cross sections after they leave the die openings 78 and 82. Also, the lateral side portions of the passages 40 and 42 must be made thicker with respect to their middle portions than the corresponding lateral side portions of the strips finally extruded from these passages, because the middle portions of the passages are more in line with the extruder bore 5 and thus the pressure exerted by the extruder screw that advances the extrudate is transmitted to a greater degree to the middle portions of the extrudate and to a lesser degree to the lateral side portions. By making the lateral side portions of the passages thicker than the middle portions, the flow resistance will be decreased at the lateral sides to compensate for this pressure differential.

The foregoing extrusion passage problems and requirements are not uncommon, except for the complications of the extrudate being divided into two strips stacked one above the other and these strips having to be guided away from one another for handling purposes. The job of shaping the passage surfaces, however, is made considerably simpler because conical shapes of the members 16, 18, and 20 give the passage surfaces 34, 35, 36, and 37 fan-like shapes that naturally cause the extrudate between them to fan out to a wider cross-section. Thus, in the further shaping of these surfaces, the only concern is in properly adjusting the thickness of the extrudate passing between them. Also, because the cone members 16, 18, and 20 are individually removable from the ring member 14, each surfaces 34, 35, 36, and 37 may be individually worked on outside of the ring member 14, without other surfaces interfering with the cutting equipment.

Ideally, to obtain the most perfect shapes possible for the passages 40 and 42, all four surfaces 34, 35, 36, and 37 should be machined to obtain passage cross sections that are symmetrical about the horizontal axis as well as the vertical axis; all passage corners should be rounded, with the thicker lateral side portions giving generally "dog-bone" shapes to the cross sections; and the longitudinal profiles of the passages 40 and 42 should be gently curved so that they not only spread apart from one another but the extrudate enters and leaves each passage horizontally. However, those skilled in the art will appreciate that the cost of machining such passages would be prohibitive in most cases.

Figure 6:
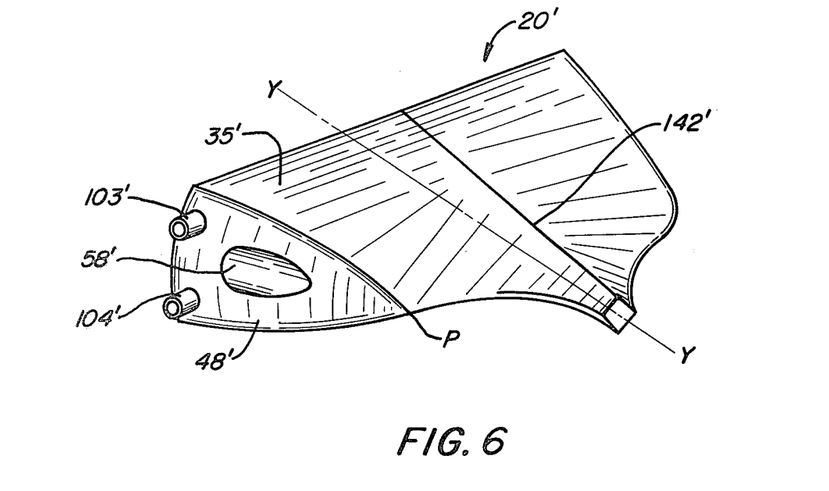
FIGS. 6 and 7 are perspective views of two different inner head sections that can be used in the extrusion die head shown in FIGS. 1 through 3.
Figure 7:
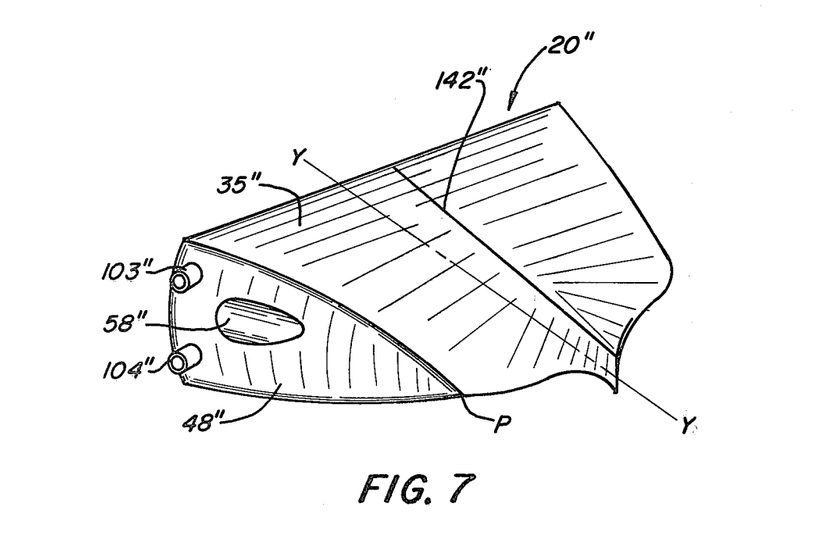

For practical purposes, the passages constructed as shown in the attached drawings have proven to form the strips in a satisfactory manner. Most of the machining, particularly that required to increase the thicknesses lateral side portions of the passages is performed on the surfaces 35 and 36 of the middle cone member 20. Two forms of these surfaces are illustrated in FIGS. 6 and 7, showing two alternative middle cone members 20' and 20" by themselves. The only machining on the surface 34 of the cone member 16 is that required to form flat portions 130 and 132 (FIG. 3) and a rounded portion 134 connecting the flat portions 130 and 132. Similar flat portions 136 and 138 and rounded portion 140 are formed on the surface 37 of cone member 18. The rounded portions 134 and 140 form a throat area between the inboard and outboard ends of the extrusion die head 2, and the portions 130 and 136 diverge from this throat area away from one another as do the portions 132 and 138. The surfaces 34 and 37 have constant profiles in all longitudinal sections parallel to that of FIG. 3. However, these surfaces do have a spreading fan shape because of the conical shape of the members 16 and 18.

As can be seen in FIG. 3, the surfaces 35 and 36 of middle cone member 20 are closest to each other at the inboard end of the die head 2, and from that point they diverge away from one another toward the outboard end of the extrusion die head to give the cone member 20 a wedge shape. As can be seen in FIGS. 6 and 7, the alternative cone members 20' and 20" have centrally located crests 142' and 142" that are each disposed at an acute angle to the central axis Y—Y of the ring member 14 that is greater than the angle at which the portions 130 and 136 of outer members 16 and 18 (FIG. 3) are disposed to the axis Y—Y, so that the passages 40 and 42 generally decrease in thickness as they approach the outboard end of the die head 2. Also, as can be seen in FIGS. 6 and 7, the portions of the flow passage surfaces 35' and 35" that are located on either side of the respective centrally located crests 142' and 142", taper from these crests away from the facing portions 130 of flow passage surface 34 on the outer cone member 16. Preferably, this tapering is, in any given cross-sectional plane perpendicular to the axis Y—Y (FIG. 8), at an angle α that is defined by the following formula:

$$\alpha = \frac{(A_{cs} - A_{oe})C}{XR^2}$$

Figure 8:
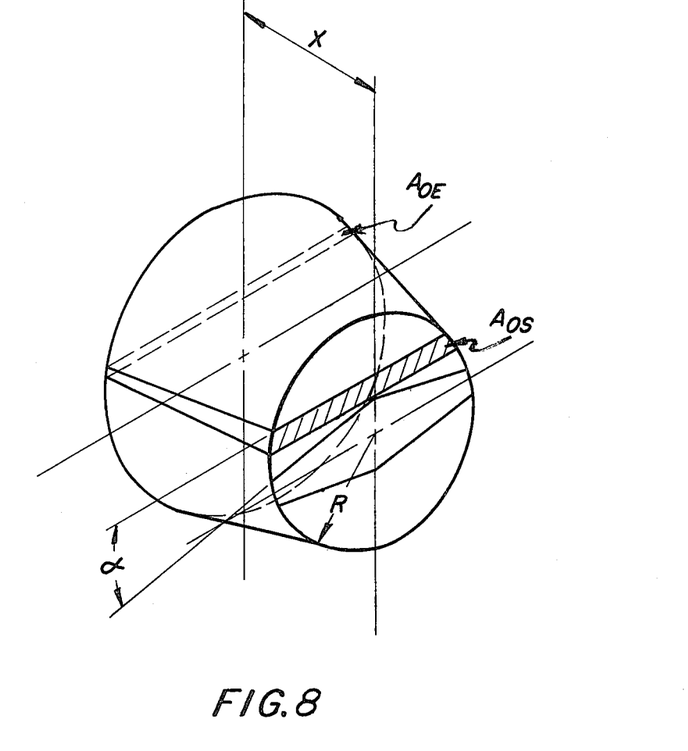
FIG. 8 is a diagrammatic representation of portions of the three cone members of FIG. 4, showing dimensions that are used in a mathematical formula for determining cutting angles in the machining of certain surfaces of the cone members to desired contours.

The variables of this formula $A_{cs}$, $A_{oe}$, X, and R, as well as the angle α are shown in the schematic view of the conical piece 24 in FIG. 8, and they are defined as follows:

α = the angle in radians between the tapering flow passage surface 35 or 36 of the middle cone member 20 and the corresponding facing flow passage surface 34 or 37 of the cone member 16 or 18;

$A_{cs}$ = the area, on any given cross-sectional plane perpendicular to the axis Y—Y, of the space between the flow passage surface 34 or 37 and a line parallel to that surface and intersecting the centrally located crest 142 or 143;

$A_{oe}$ = the area, on the plane of the end surfaces of the cone members at the outboard end of said extrusion die head, of the space between the flow passage surface 34 or 37 and a line parallel to that surface and intersecting the said centrally located crest 142 or 143;

X = the distance between the cross-sectional plane of the area $A_{cs}$ and the plane of the end surfaces of the cone members at the outboard end of said extrusion die head; and R = the radius of the cone members at cross-sectional plane on which the area $A_{cs}$ is taken.

Also, C is a constant equal to or greater than 1.00 and preferably no greater than 2.00. This constant may be adjusted to vary the extent to which the lateral side portions of the passages are enlarged, particularly at the inboard side of the die head 2. With C equal to 2.00, the surfaces of the middle cone member assumes the shape of surfaces 35' and 36' of the cone member 20' of FIG. 6. These surfaces provide a very large initial flow of extrudate to the lateral side portions of the passages 40 and 42, which helps provide a more even pressure distribution across the width of extruded strip it emerges from the die openings at the outboard end of the head 2. However, the cone member 20' of FIG. 6 has the disadvantage of having a very small conical surface 48' for seating on the conical surface 22 of the ring member 14. For this reason, a C factor of greater than 2.00 should not be used, because with a smaller conical surface than that of 48', there will most likely be difficulties in seating the middle cone member in the ring member 14 each time it is replaced after cleaning. Another problem with large C factor is the large head fill volume that results in a large amount of extrudate being trapped and wasted each time the extruder is shut down.

The middle cone member 20" of FIG. 7 was formed using a C factor much smaller than 2.00, and closer to 1.00. The surface 35" of this cone member does not provide as large an initial flow of extrudate to the lateral side portions of the passage 40, and consequently, the pressure distribution across the width of the strip tends to be less uniform. However, the head fill volume with the cone member 20" is less, the cone member 20" is heavier and easier to seat on in the ring member 14, there is less machining required because the angles of correction are less, and most importantly the angles of correction can be increased at a later time if this is found desirable.

With both the cone members 20' and 20", the above formula for calculating the angle α at various cross sections is used between the outboard end of the cone member and a point P, the point where the lateral edges of the surfaces 35' and 35" meet the corresponding surfaces on the underside of the cone members 20' and 20". Of course, the location of the point P will depend not only on the value of C factor being used to calculate the angle α, but also on the radius R of the cone member and the angle at which the crest 142' or 142" is inclined to the axis Y—Y. On the portions of the cone members 20' and 20" between the point P and their inboard ends, the correction angle α may be increased uniformly to a final value of 45°, as illustrated by the cone member 20 in FIG. 6, or 90° as illustrated by the cone member 20" in FIG. 7, or to some value between 45° and 90°.

The surface 36 on the underside of the middle cone member 20 has, of course, a contour identical whatever contour is chosen for the surface 35. The surfaces 35 and 36 may be each formed by setting a milling cutter on the surface at a point that is midway between its lateral edges and is at a selected distance from the edge where the surface intersects outboard end surface of the cone member 20. Then, the cutter is moved parallel to the outboard end surface and toward one of the lateral edges of the cone member at a selected angle to the original plane of the surface as it existed after the conical piece 24 was cut into the three members 16, 18, and 20. Preferably, this angle should be calculated using the formula for the angle set forth above. This movement of the cutter causes the removal of material from the cone member 20 forming a surface that tapers away from the point in the middle of the surface at which the cutter was originally set. The foregoing cutting is then repeated at varying distances from the edge where the surface 35 intersects the outboard end surface of the cone member 20, using different angles at which the cutter is moved with respect to the original plane of the surface, with the size of these angles increasing as the distances from the outboard end surface increase. Each of the lateral sides of each of the surfaces 35 and 36 is formed in the same manner until the point P is reached, whereupon the angle at which the cutter is moved with respect to the original plane of the surface is preferably increased at a uniform rate between the point P and the inboard end of the cone member 20, with the final angle of cutter movement at the inboard end of the cone member 20 being between 45° and 90°.

As an example of the relative dimensions and angles of typical cone members 16, 18, and 20, a 9.0 inch (229 mm) width from inboard to outboard end is suitable for the cone members and their associated ring member 14, for use on an extruder 4 having a 5.906 inch (150 mm) diameter bore 5 (FIG. 3). The angle of inclination of the conical ring surfaces 24 and mating cone surfaces 44, 46, and 48 should be about 30° to the central axis Y—Y. The angle of inclination of the surface 18 to the axis Y—Y should also be about 30°, and in one case, the throat formed by the rounded surface portions 134 and 140 was located 2.647 inches (67.2 mm) from the inboard ends 30 of the cone members. The die openings 78 and 82 were spaced 5.5 inches (140 mm) apart, with the angles of the flat portions 130 and 136 to the axis Y—Y being 15°. The angle of the crests 142 and 143 on the cone member 20 was set at 17°.

While several embodiments of the present invention have been thus shown and described, other embodiments, modifications, and additions will of course be apparent to those skilled in the art, without departing from the scope of the appended claims.

We claim:

1. An extrusion die head for forming two elongated strips of elastomeric material from a core of said material emanating from a single bore in an extruder, said extrusion die head having an inboard end to be located facing toward said extruder and an outboard end to be located facing away from said extruder, said extrusion die head including an outer head section having a central opening extending from said inboard end to said outboard end, an inner head section located within said central opening and spaced from the walls of said central opening so as to define two separate passages for guiding the flow of said elastomeric material through said head, characterized in that:
    (a) said outer head section includes a ring member having a central axis and extending from said inboard end to said outboard end of said extrusion die head, said ring member having a radially inwardly facing conical surface, said inwardly facing conical surface having a relatively small diameter at said inboard end of said extrusion die head and a relatively large diameter at said outboard end of said extrusion die head,
    (b) said outer head section also includes first and second cone members each having on one side a radially outwardly facing conical surface mating with the radially inwardly facing conical surface of said ring member and on the opposite side a flow passage surface forming one of said walls of said central opening, and
    (c) said inner head section includes a middle cone member disposed between said first and second cone members and extending across said central opening to divide said central opening into said two separate passages, the side edges of said middle cone member being radially outwardly facing conical surfaces that mate with the radially inwardly facing conical surface of said ring member, the top and bottom sides of said middle cone member each facing one of said flow passage surfaces of said first and second cone members forming therewith one of said passages for guiding the flow of said elastomeric material through said head, thereby forming said elastomeric material into a desired strip shape as said material passes from said inboard end to said outboard end of said extrusion die head.

2. The extrusion die head according to claim 1 characterized further by said middle cone member being in the shape of a wedge with said flow passage surfaces of said middle cone member being closest to each other at said inboard end of said extrusion die head, said flow passage surfaces of said middle cone member diverging away from one another in the direction away from said inboard end and toward said outboard end of said extrusion die head.

3. The extrusion die head according to claim 1 characterized further by said flow passage surfaces of said first and second cone members being spaced closest to each other at a throat area between said inboard and outboard ends of said extrusion die head, said flow passage surfaces of said first and second cone members diverging away from each other in both axial directions away from said throat area and toward said inboard and outboard ends of said extrusion die head.

4. The extrusion die head according to claim 3 characterized further by said ring member having a central axis for alignment with said bore in said extruder, and the portions of said flow passage surfaces of said first and second cone members between said throat area and said outboard end of said extrusion die head being substantially flat and being disposed at a first acute angle to said central axis of said ring member.

5. The extrusion die head according to claim 4 characterized further by said middle cone member being in the shape of a wedge with said flow passage surfaces of said third cone member being spaced closest to each other at said inboard end of said extrusion die head, said flow passage surfaces of said middle cone member diverging away from one another in the direction away from said inboard end of said extrusion die head, each of said flow passage surfaces of said middle cone member having a centrally located crest extending from said inboard end of said extruder die head to said outboard end of said extrusion head, said centrally located crest being disposed at a second acute angle to said axis of said ring member that is greater than said first acute angle at which said flow passage surfaces of said first and second cone members are disposed, and the portions of said flow passage surfaces on either side of said centrally located crests tapering from said crests away from the facing flow passage surfaces of said cone members, so that said flow passages increase in thickness in a direction toward said outboard end of said extrusion die head and also increase in thickness in the directions away from said centrally located crests and toward the lateral sides of said flow passages.

6. The extrusion die head according to claim 5 characterized further by each of said flow passage surfaces on either side of said centrally located crests tapering, in any given cross-sectional plane perpendicular to said axis of said ring member, at an angle to the corresponding facing flow passage surface of said first or second member that is equal to the following:

$$\alpha = \frac{(A_{cs} - A_{oe})C}{XR^2}$$

where
- $\alpha$ = the angle in radians between the tapering flow passage surface of said middle cone member and the corresponding facing flow passage surface of said first or second cone member;
- $A_{cs}$ = the area, on said given cross-sectional plane, of the space between the flow passage surface of the first or second cone member and a line parallel to the said surface of said first or second cone member and intersecting the said centrally located crest;
- $A_{oe}$ = the area, on the plane of the end surfaces of said cone members at the outboard end of said extrusion die head, of the space between the flow passage surface of the first or second cone member and a line parallel to the said surface of said first or second cone member and intersecting the said centrally located crest;
- $X$ = the distance between the said given cross-sectional plane and the plane of the end surfaces of said cone members at the outboard end of said extrusion die head;
- $R$ = the radius of the cone members at the said given cross-sectional plane; and
- $C$ = a factor between 1.00 and 2.00 inclusive that is maintained constant for any given extrusion die head.

7. The extrusion die head according to claim 1 characterized further by said middle cone member having bolt holes extending from said outboard end of said extrusion die head through said outwardly facing conical surfaces, said ring member having threaded holes aligned with each of said bolt holes in said middle cone member and extending from said inwardly facing conical surface toward said inboard end of said extruder the head, and bolts extending through said bolt holes in said middle cone member and engaging said threaded holes in said ring member to secure said middle cone member to said ring member.

8. The extrusion die head according to claim 1 or claim 7 characterized further by said first and second cone members having threaded holes in said outwardly facing conical surfaces and extending radially inwardly therefrom, said ring member having bolt holes aligned with said threaded holes in said first and second cone members and extending radially outwardly from said inwardly facing conical surface and through the outer periphery of said ring member, and bolts extending through said bolt holes in said ring member and engaging said threaded holes in said first and second cone members for securing said first and second cone members to said ring member.

9. The extrusion die head according to claim 7 characterized further by
   (a) said three cone members having end surfaces at the outboard end of said extrusion die head,
   (b) an inside die plate secured to the end surface of said middle cone member and partially covering said extrusion flow passages at said outboard end of said extrusion die head, and
   (c) two outside die plates each positioned on the planar end surface of one of said first and second cone members, said outside die plates each partially covering one of said extrusion flow passages and being spaced from said inside die plate to form a die opening for one of said elongated strips emanating from said extrusion die head.

10. The extrusion die head according to claim 9 characterized further by said inside die plate being divided into two inside die plate sections, a bolster bar located on the outboard side of and engaging both of said inside die plate sections, and means securing said bolster bar to said middle cone member.

11. The extrusion die head according to claim 9 further characterized by two clamping devices anchored to said outer head section, each of said clamping devices having
    (a) a clamp member,
    (b) means anchored to said outer head section for moving said clamp member with respect to said outer head section toward and away from said axis of said ring member,
    (c) cam means anchored to said outer head section and engaging said clamp member when said clamp member moves toward said axis of said ring member so as to force said clamp member against one of said outside die plates to hold said outside die plate in a fixed position on one of said planar end surfaces of said first and second cone members.

12. A method of making an extrusion die head for forming two elongated strips of elastomeric material from a core of said material emanating from a single bore in an extruder, characterized by the steps of;
    (a) fabricating a ring member and machining on said ring member a radially inwardly facing conical surface,
    (b) fabricating a conical piece with an outboard end surface and an axially extending surface intersecting said outboard end surface, and machining said axially extending surface to form a radially outwardly facing conical surface that mates with said radially inwardly facing conical surface of said ring member,
    (c) cutting said conical piece into three cone members along two cutting planes that intersect said base surface,
    (d) machining the cone member surfaces that extend along said cutting planes to a configuration such that when said cone members are mounted with their radially outwardly facing conical surfaces engaging the mating radially inwardly facing conical surface of said ring member, the said surfaces extending along said cutting planes form two extrusion passages of the desired shape for guiding and forming said elongated strips of elastomeric material, and
    (e) reassembling and mounting said cone members within said ring member with said radially outwardly facing conical surfaces of said cone members engaging said mating radially inwardly facing conical surface of said ring member and positioned so as to form said two extrusion passages of said desired shape.

13. The method of making an extrusion die head according to claim 12 characterized further by the cutting of said cone piece into three parts being along two cutting planes that are each perpendicular to a plane that is perpendicular to said base surface and extends through the central longitudinal axis of the conical piece, said cutting planes diverging away from each other as the planes approach outboard end surface, and said machining of the cone member surfaces formed by said cutting including the steps of:

(1) taking the middle cone member that has surfaces extending along both of said cutting planes, and setting a cutter on one of said surfaces at a point that is midway between the lateral edges of said one surface and is at a selected distance from the edge where said one surface intersects said outboard end surface of said cone member, (2) moving said cutter parallel to said outboard end surface and toward one of said lateral edges along a line at a selected angle to the said cutting plane of said surface, thereby cutting away material from said middle cone member and forming a surface that tapers away from said point midway between said lateral edges of said middle cone member, (3) repeating steps (1) and (2) at varying distances from said edge where said one surface intersects said outboard end surface, moving the cutter toward said one lateral edge along lines that are at different selected angles to the said cutting plane of said surface, the size of said selected angles increasing as the said selected distances from said outboard end surface edge increase, (4) repeating steps (1), (2) and (3) on the other side of said one surface, moving the cutter toward the other lateral edge of said one surface, and (5) repeating steps (1), (2), (3) and (4) on the other surface of said middle cone member that extends along the other of said two cutting planes.

* * * * *